(12) United States Patent
Choi

(10) Patent No.: US 11,241,964 B2
(45) Date of Patent: Feb. 8, 2022

(54) INPUT DEVICE AND VEHICLE COMPRISING THE SAME

(71) Applicants: Hyundai Motor Company, Seoul (KR); Kia Motors Corporation, Seoul (KR)

(72) Inventor: Young Rok Choi, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/066,783

(22) Filed: Oct. 9, 2020

(65) Prior Publication Data

US 2021/0362603 A1 Nov. 25, 2021

(30) Foreign Application Priority Data

May 25, 2020 (KR) .................. 10-2020-0062247

(51) Int. Cl.
*B60K 37/06* (2006.01)
*B60R 11/02* (2006.01)
*H01H 19/14* (2006.01)

(52) U.S. Cl.
CPC .......... *B60K 37/06* (2013.01); *B60R 11/0235* (2013.01); *H01H 19/14* (2013.01); *B60K 2370/126* (2019.05)

(58) Field of Classification Search
CPC .............. B60K 37/06; B60K 2370/126; B60R 11/0235; H01H 19/14
See application file for complete search history.

(56) References Cited

U.S. PATENT DOCUMENTS

| | | | |
|---|---|---|---|
| 2008/0100569 A1* | 5/2008 | Lum | G01D 5/3473 345/156 |
| 2017/0162347 A1* | 6/2017 | Harazawa | H01H 9/56 |
| 2018/0010932 A1* | 1/2018 | Bach | F24C 7/082 |
| 2020/0378610 A1* | 12/2020 | Williams | F24C 7/083 |

* cited by examiner

*Primary Examiner* — Christopher E Leiby
(74) *Attorney, Agent, or Firm* — Morgan, Lewis & Bockius LLP

(57) ABSTRACT

An input device configured for enhancing the image formed on the vehicle may include a body; a light emitter provided on an upper side of the body; a light receiver provided at the upper side of the body to be spaced from the light emitter and configured to receive light irradiated from the light emitter to operate; a dial knob supported by the body and rotatable around a rotation axis of the dial knob in a response to a user's manipulation; a protruding portion protruding from a bottom portion of the dial knob between the light emitter and the light receiver to selectively transmit the light irradiated from the light emitter toward the light receiver according to a rotation of the dial knob; a motor connected to the dial knob and configured to rotate the dial knob; and a controller configured to control the motor based on whether the light receiver is operated.

18 Claims, 8 Drawing Sheets

INPUT DEVICE AND VEHICLE COMPRISING THE SAME

CROSS-REFERENCE TO RELATED APPLICATION(S)

The present application claims priority to Korean Patent Application No. 10-2020-0062247, filed on May 25, 2020 in the Korean Intellectual Property Office, the entire contents of which is incorporated herein for all purposes by this reference.

BACKGROUND OF THE INVENTION

Field of the Invention

The present invention relates to an input device and vehicle including the same, and more particularly, to an input device and vehicle including the same that rotates a dial knob into a predetermined reference position.

Description of Related Art

A vehicle is a moving means or a transportation means that travels on a road or a line using fossil fuels, electricity, or the like as a power source. Examples of the vehicle may include a three-wheeled or four-wheeled vehicle, a two-wheeled vehicle such as a motorcycle, a construction machine, a motorized bicycle, a bicycle, and a train running on a track.

In general, various electronic devices are being made through the development of electronic communication technology, and these electronic devices are increasingly emphasizing the elegance of design as well as the user's operation convenience. What is emphasized according to the present trend is the diversification of input devices represented by keyboards or keypads.

Input devices used in vehicles are used in various types of display systems that provide information to users, such as AVN devices. In the case of an input device used in a vehicle, since it may be designed so that the driver can easily manipulate it while looking ahead, research on an input device using a dial knob is active.

In recent years, there is a trend in which an input device in a form of a dial knob is customized and produced according to a demand of a consumer. For example, a logo of a vehicle brand is formed on an input device in a form of a dial knob to promote a high-end vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an input and a vehicle including the same configured for returning a position of a dial knob to a preset position when a user ends the user of the vehicle.

In accordance with an aspect of the present invention, an input device provided in a vehicle may include a body; a light emitter provided on an upper side of the body; a light receiver provided at the upper side of the body to be spaced from the light emitter and configured to receive light irradiated from the light emitter to operate; a dial knob supported by the body and rotatable around a rotation axis of the dial knob in a response to a user's manipulation; a protruding portion protruding from a bottom portion of the dial knob between the light emitter and the light receiver to selectively transmit the light irradiated from the light emitter toward the light receiver according to a rotation of the dial knob; a motor connected to the dial knob and configured to rotate the dial knob; and a controller configured to control the motor based on whether the light receiver is operated.

The protruding portion may be configured to transmit the light irradiated from the light emitter toward the light receiver when the dial knob is positioned at a predetermined reference position.

The protruding portion may be configured to block the light irradiated from the light emitter toward the light receiver when the dial knob is not positioned at a predetermined reference position.

The controller may be configured to operate the motor to rotate the dial knob when the light receiver does not operate.

The controller may be configured to stop operating of the motor when the light receiver operates.

The controller may be configured to control the motor based on whether the light receiver is operated when the vehicle is turned off.

The controller may be configured to control the motor based on whether the light receiver is operated when the dial knob is not rotated by the user's manipulation for a preset time.

The dial knob may include a connector connected to the motor; and a concave portion formed to be concave outside the connector.

The protruding portion may be configured to be formed in the concave portion of the dial knob.

The light emitter and the light receiver may be provided on a first printed circuit board provided on an upper side of the body, the controller and the motor are provided on a second circuit board provided inside the body, and the first printed circuit and the second printed circuit board may be electrically connected.

The light emitter may irradiate light when AVN device of the vehicle is turned on.

A vehicle may include AVN device and the input device.

The AVN device may set a driving route based on a destination set by the user and a current location of the vehicle, and generates Turn by Turn (TBT) information based on the set driving route, and the input device may rotate the dial knob based on the TBT information generated by the AVN device.

The input device may determine rotation direction of the dial knob based on the rotation direction of the vehicle included in the TBT information, and rotate the dial knob in the determined rotation direction thereof.

The input device may rotate the dial knob to the predetermined reference position based on whether the light receiver is operated when a driving route guidance by the AVN device is finished.

The input device may further include a push button provided on the upper side of the dial knob and configured to receive a push input thereto, and the AVN device may receive a name of a destination from the user, display a list of places matching the name of the received destination, change the position of the cursor on the list based on the rotation input received from the dial knob, and set a place where the cursor is located as the destination of the vehicle based on the push input received from the push button, and continuously automatically change the position of the cursor on the list when the push input is received for a preset time and the rotation input is received while the push input is being received.

The AVN device may stop the automatic position change of the cursor when the push input or the rotation input is received while continuously automatically changing the position of the cursor on the list The input device may rotate the dial knob to the predetermined reference position based on whether the light receiver is operated when the automatic position change of the cursor is stopped.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
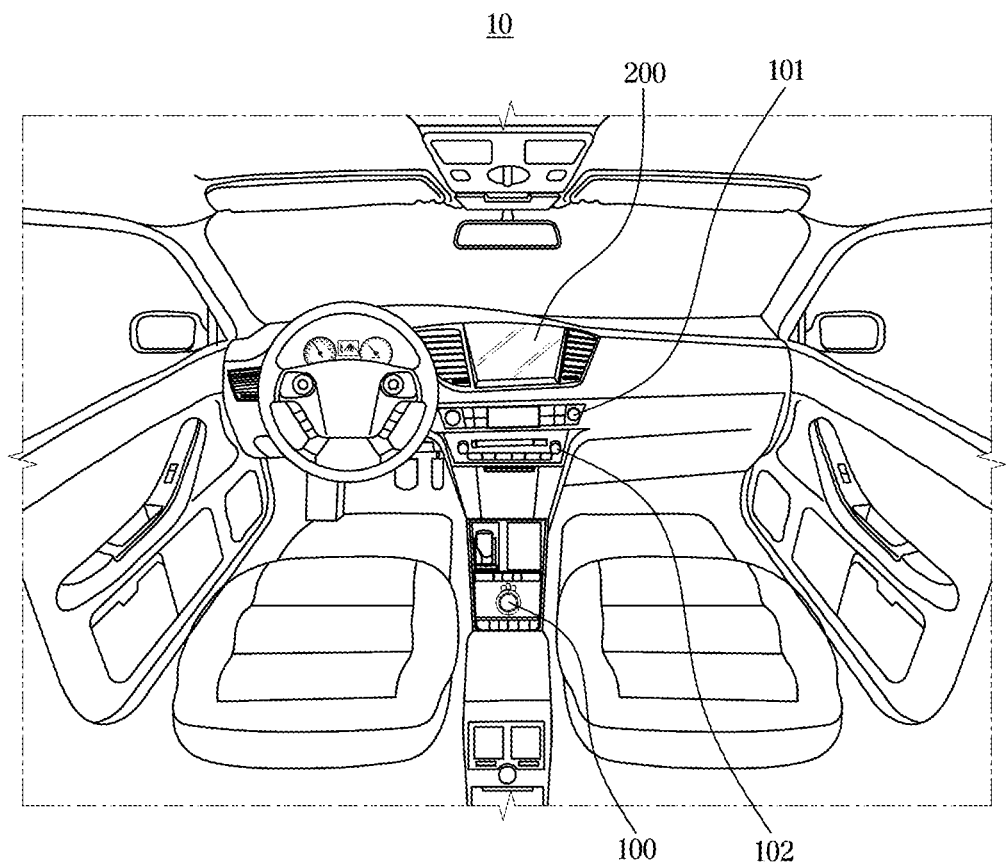
FIG. 1 is a diagram illustrating the interior of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings, wherein like reference numerals refer to like elements throughout. The present specification does not describe all elements of the exemplary embodiments of the present invention and detailed descriptions on what are well-known in the art or redundant descriptions on substantially the same configurations may be omitted.

The terms 'unit, module, member, and block' used herein may be implemented using a software or hardware component. According to various exemplary embodiments of the present invention, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added. When a part (portion) of the specification is said to "include" a certain component, it means that other components may be further included rather than excluding other components unless specifically stated to the contrary. Furthermore, the term "part (portion)" used in the specification refers to a hardware component such as software, FPGA, or ASIC, and "unit" performs certain roles. However, "part (portion)" is not meant to be limited to software or hardware. The "part (portion)" may be configured to be in an addressable storage medium or may be configured to reproduce one or more processors. Thus, as an example, "unit" refers to components such as software components, object-oriented software components, class components, and task components, processes, functions, properties, procedures, and includes subroutines, segments of program code, drivers, firmware, microcode, circuitry, data, database, data structures, tables, arrays and variables. The functions provided within the components and "units" may be combined into a smaller number of components and "units" or may be further divided into additional components and "units".

Throughout the specification, when a member is located "on" another member, this includes not only when one member is in contact with another member but also when another member is present between the two members.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present invention will be described in detail with reference to the accompanying drawings.

Figure 2:
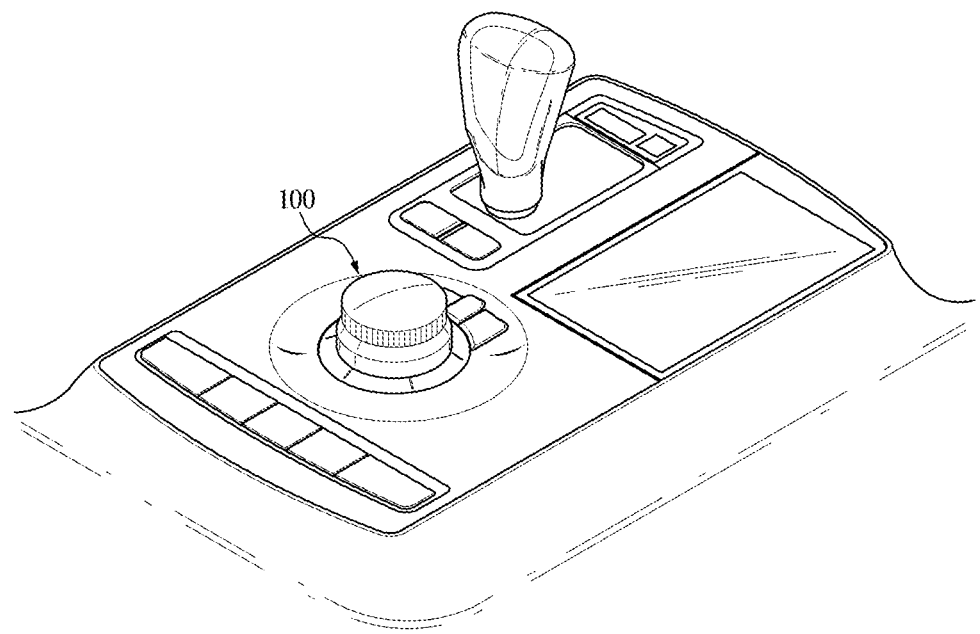
FIG. 2 is a diagram illustrating an input device provided inside a vehicle according to an exemplary embodiment of the present invention.

FIG. 1 is a diagram illustrating the interior of a vehicle according to an exemplary embodiment of the present invention. FIG. 2 is a diagram illustrating an input device provided inside a vehicle according to an exemplary embodiment of the present invention.

Referring to FIGS. 1 to 2, the vehicle 10 according to various exemplary embodiments of the present invention includes an audio video navigation (AVN) device and an input device configured for controlling the configuration of the AVN device 200 and/or various vehicles 10 (100, 101, 102) may be included.

The AVN device 200 according to various exemplary embodiments of the present invention may mean a multimedia device in which audio, video, navigation, and telematics terminals are integrated into one.

The AVN device 200 receives a destination set by the user, sets a driving route based on the destination and the current location of the vehicle 10, and guides the driving route to the user by displaying the set driving route.

The AVN device 200 receives the name of the destination from the user through touch input or voice input, and may request the user the selection of the destination by displaying a list of places matching the input destination name.

Furthermore, the AVN device 200 generates Turn by Turn (TBT) information based on a driving route set according to a destination selected by a user, and guides the driving direction of the vehicle 10 by displaying the generated TBT information.

For example, the TBT information may mean direction information such as 11 o'clock, 1 o'clock, right turn, 5 o'clock, U-turn, 8 o'clock, left turn, and the like.

The AVN device 200 may be turned on by receiving power from a battery even when the vehicle 10 is turned off.

For example, the AVN device 200 may receive power for a preset time (for example, for 30 seconds) after the user opens and closes the door of the vehicle 10 with the engine turned off, or for a preset time (for example, for 30 seconds) immediately after the user turns off the vehicle 10.

The input devices 100, 101, and 102 according to various exemplary embodiments of the present invention may refer to all devices that receive an input that controls the AVN device 200.

For example, the input devices 100, 101, and 102 may include a control knob, and may receive a rotation input from a user.

The input devices 100, 101, and 102 may be provided on the center fascia of the vehicle 10, but are not limited thereto. For example, the input device 100 may be provided between the driver's seat and the passenger seat of the vehicle 10.

The input devices 100, 101, and 102 may not only receive an input for controlling the AVN device 200, but may also receive an input for changing a shifting stage of the vehicle 10.

Hereinafter, for convenience of explanation, it is assumed that the input device 100 is provided between the driver's seat and the passenger seat and is a device in a form of a control knob that receives an input for controlling the AVN device 200, it goes without saying that a control knob that receives an input for controlling any one of various components of the vehicle 10 may belong to the category of the input device according to various exemplary embodiments of the present invention.

Figure 3:
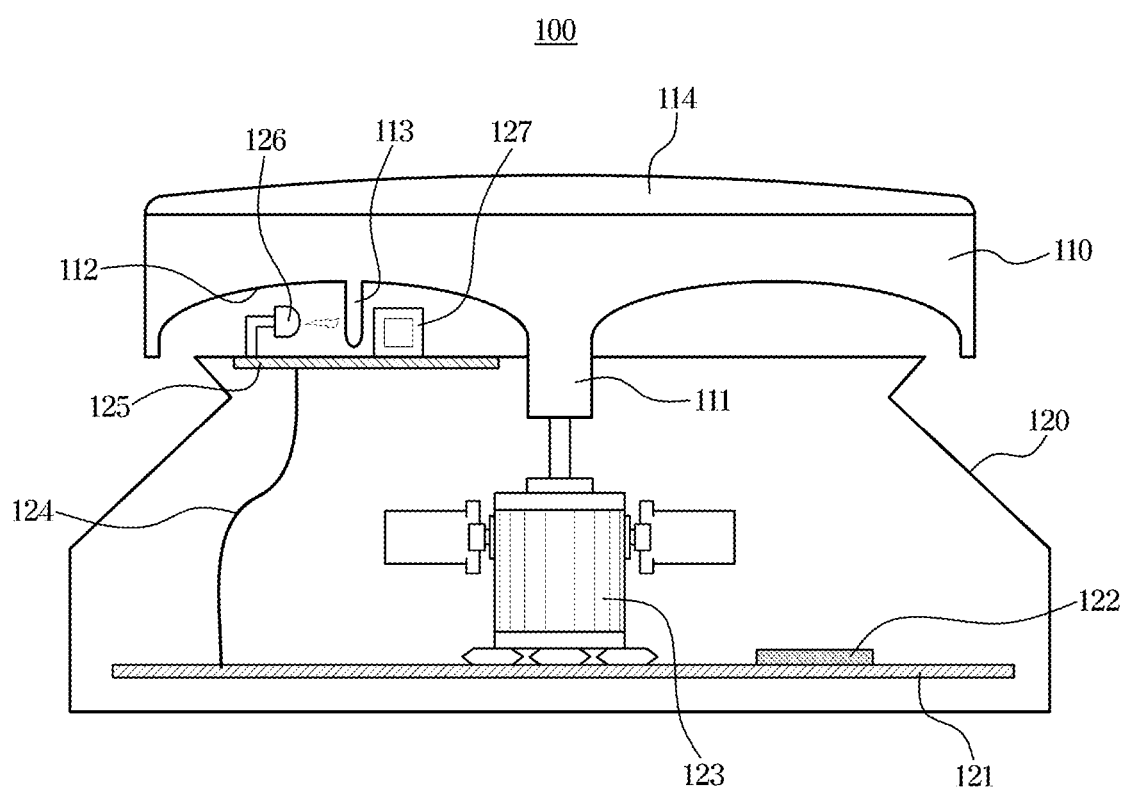
FIG. 3 is a diagram illustrating a lateral cross-sectional view of an input device according to an exemplary embodiment of the present invention.

FIG. 3 is a diagram illustrating a lateral cross-sectional view of an input device according to an exemplary embodiment of the present invention.

Referring to FIG. 3, the input device 100 according to various exemplary embodiments of the present invention may include a body 120 and a dial knob 110.

A main printed circuit board 121 (hereinafter, "a first printed circuit board") may be provided in the internal space of the body 120, and a controller 122 and a motor 123 may be provided on the first printed circuit board 121.

The controller 122 may control various configurations of the input device 100, and for example, may control the motor 123 to rotate the dial knob 110.

A sub-printed circuit board 125 (hereinafter referred to as "second printed circuit board") may be provided on the upper portion of the body 120, the light emitter 126 and the light receiver 127 may be provided to be spaced from each other on the second printed circuit board 125.

In the instant case, the first printed circuit board 121 and the second printed circuit board 125 may be electrically connected to each other through the flexible wire 124.

The dial knob 110 may be supported by the body 120 and may rotate around a rotation axis from a predetermined reference position according to a user's manipulation.

Furthermore, the dial knob 110 may include a connector 111 connected to the motor 123 and a concave portion 112 formed concave on the outside of the connector 111, and the shaft to which the motor 123 is connected to the connector 111 may correspond to a rotation shaft of the dial knob 110.

The dial knob 110 may generate a control signal for controlling the AVN device 200 by being rotated about a rotation axis from a predetermined reference position according to a user's manipulation.

Furthermore, the dial knob 110 may be rotated regardless of a user's operation according to the operation of the motor 123. In other words, the controller 122 may control the motor 123 to control the rotation of the dial knob 110.

A push button 114 configured to be pushed downward may be mounted on an upper side of the dial knob 110. The push button 114 may receive a push input from a user.

A protruding portion 113 is formed on the bottom portion of the dial knob 110 that protrudes between the light emitter 126 and the light receiver 127 and selectively transmits the light irradiated from the light emitter 126 toward the light receiver 127 as the dial knob 110 rotates.

The protruding portion 113 may be provided on the concave portion 112 of the dial knob 110 and may protrude toward between the light emitter 126 and the light receiver 127 provided to be spaced from each other.

When the dial knob 110 is positioned at a predetermined reference position, a hole is formed on the protruding portion 113 protruding between the light emitter 126 and the light receiver 127 to transmit the light irradiated from the light emitter 126 toward the light receiver 127.

Alternatively, when the dial knob 110 is positioned at a predetermined reference position, the protruding portion 113 is not protruded between the light emitter 126 and the light receiver 127, therefore, the light irradiated from the light emitter 126 may be transmitted toward the light receiver 127.

Hereinafter, the protruding portion 113 will be described in detail with reference to FIG. 4A and FIG. 4B.

Figure 4A:
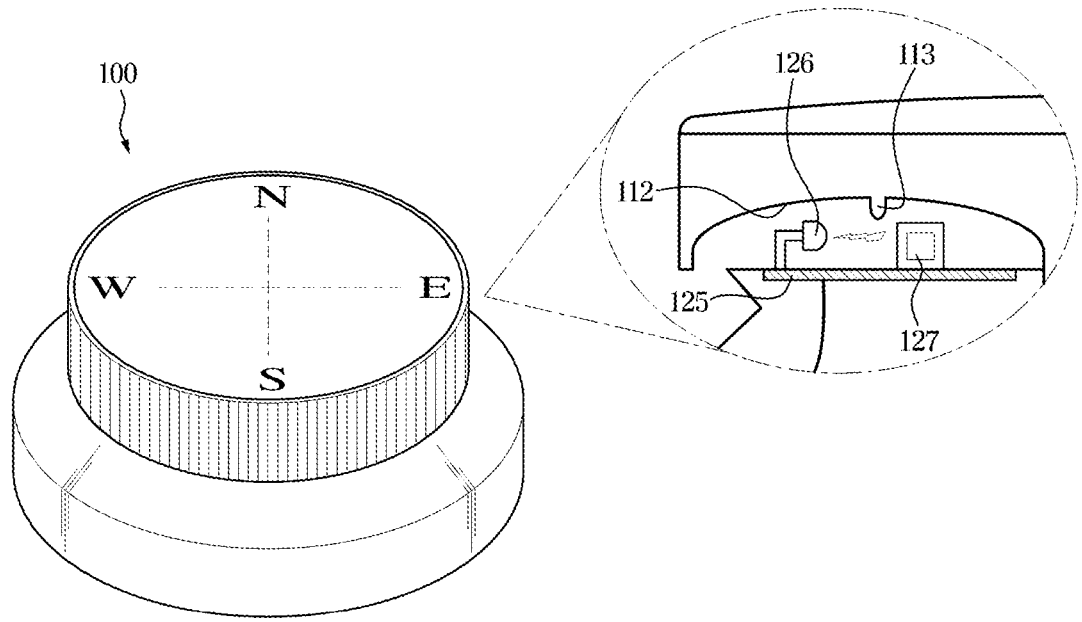
FIG. 4A is a diagram illustrating a lateral cross-sectional view of an input device when a dial knob is positioned in a forward direction according to an exemplary embodiment of the present invention.

FIG. 4A is a diagram illustrating a lateral cross-sectional view of an input device when a dial knob is positioned in a forward direction according to an exemplary embodiment of the present invention. FIG. 4B is a diagram illustrating a lateral cross-sectional view of an input device when a dial knob is not positioned in a forward direction according to an exemplary embodiment of the present invention.

Referring to FIG. 4A, when the dial knob 110 is positioned at a predetermined reference position, the protruding portion 113 positioned between the light emitter 126 and the light receiver 127 may not protrude. Referring to FIG. 4B, when the dial knob 110 deviates from a predetermined reference position, the protruding portion 113 located between the light emitter 126 and the light receiver 127 is protruded to block light irradiated from the light emitter 126.

That is, when the dial knob 110 is positioned at a predetermined reference position, the light receiver 127 can operate by receiving the light irradiated from the light emitter 126, and when the dial knob 110 is not positioned at a predetermined reference position, the light receiver 127 cannot receive the light irradiated from the light emitter 126.

For the present purpose, the protruding portion 113 includes a portion which is not protruded or a portion where a hole is formed, and may be rotated with the dial knob 110. Also, a portion which is not protruded or a portion in which a hole is formed may be attached to the bottom portion of the dial knob 110 so that it is located between the light emitter 126 and the light receiver 127 when the dial knob 110 rotates and is positioned at a predetermined reference position.

In the instant case, the predetermined reference position may mean a position of the dial knob 110 when the customized logo attached to the upper side of the input device 100 is in the forward direction thereof, but is not limited thereto.

As above, the protruding portion 113 may transmit or block light irradiated from the light emitter 126 toward the light receiver 127 according to the rotation of the dial knob 110.

In the above, the configuration of the input device 100 has been described with reference to FIG. 3 and FIG. 4.

Hereinafter, a control block diagram of the vehicle 10 according to an exemplary embodiment will be described with reference to FIG. 5.

Figure 5:
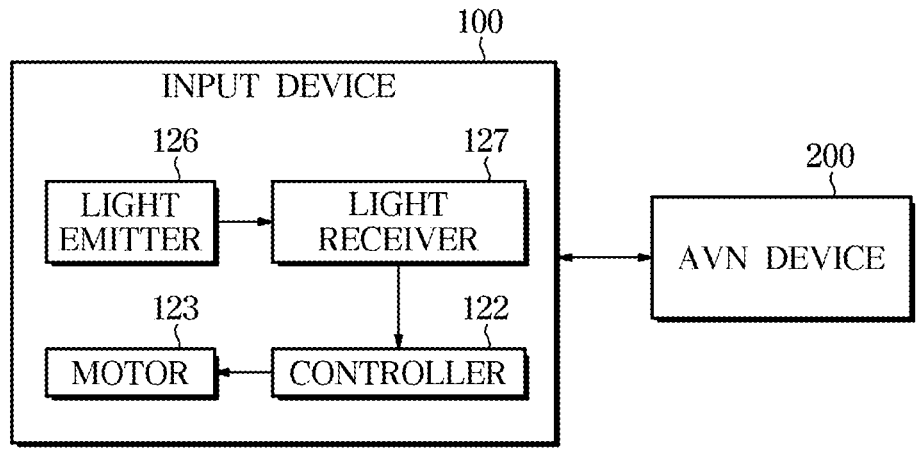
FIG. 5 is a control block diagram of a vehicle according to an exemplary embodiment of the present invention.

FIG. 5 is a control block diagram of a vehicle according to an exemplary embodiment of the present invention.

Referring to FIG. 5, a vehicle 10 according to various exemplary embodiments of the present invention may include an input device 100 and an AVN device 200.

The input device 100 according to various exemplary embodiments of the present invention may include a controller 122 for controlling various configurations of the input device 100, a light emitter 126 to irradiate light, a light receiver 127 operating by receiving the light irradiated from the light emitter 126, and a motor 123 that rotates the dial knob 110 by operating under the control of the controller 122.

The light emitter 126 may mean any configuration configured for irradiating light, such as a light emitting diode, and may emit light by receiving power from the battery of the vehicle 10.

The light emitter 126 may irradiate light in a specific situation under the control of the controller 122, for example, when the AVN device 200 is turned on.

The light receiver 127 can refer to any configuration that operates when light is irradiated. For example, the light receiver 127 may include a photo transistor.

The light receiver 127 may be operated upon receiving the irradiated light from the light emitter 126, and can transmit an operation signal to the controller 122. For example, if the light receiver 127 is a photo transistor, when light is received from the light emitter 126, a logic HIGH signal may be transmitted to the controller 122.

The controller 122 may control the motor 123 based on whether the light receiver 127 is operating.

The controller 122 can rotate the dial knob 110 by operating the motor 123 when the light receiver 127 does not operate, and stops the operation of the motor 123 to fix the location of the dial knob 110 when the light receiver 127 operates.

For this, the controller 122 may be implemented as an algorithm for controlling the operation of the motor 123 or a memory that stores data for a program that reproduces the algorithm, and a processor that performs the above-described operation using data stored in the memory.

In the instant case, the memory and the processor may be implemented as separate chips, respectively. Alternatively, the memory and processor may be implemented as a single chip. Furthermore, the controller 122 may receive various signals from various components of the vehicle 10 using a controller area network (CAN) communication method.

The AVN device 200 according to various exemplary embodiments of the present invention may be controlled based on an input received from the input device 100. For example, the AVN device 200 may be controlled based on a rotation input of the dial knob 110 or a push input of the push button 114.

The control block diagram of the vehicle 10 according to an exemplary embodiment has been described above. Hereinafter, various embodiments using various configurations of the vehicle 10 described above will be described.

Figure 6:
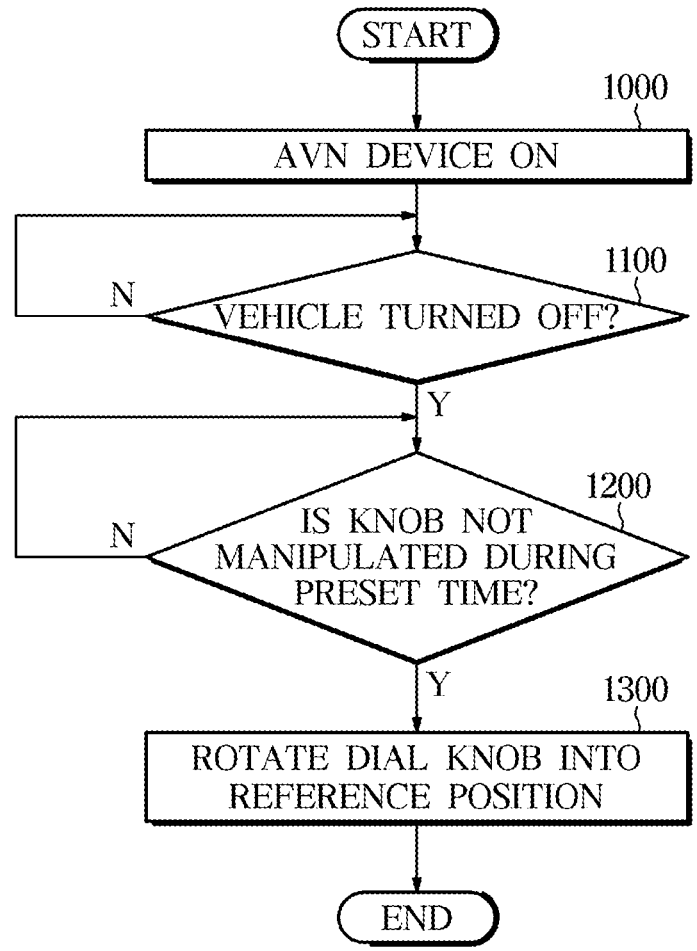
FIG. 6 is a flowchart of a vehicle control according to the various exemplary embodiments.

FIG. 6 is a flowchart of a vehicle 10 control according to the various exemplary embodiments.

Referring to FIG. 6, when the AVN device 200 is turned on, the controller 122 may interwork with the AVN device 200 to transmit a rotation input or a push input input from a user to the AVN device 200 (1000).

When the vehicle 10 is turned off (example of 1100) or the dial knob 110 is not rotated by the user's operation for a preset time (example of 1200), the dial knob 110 may be rotated to the original position (1300).

When the vehicle 10 is turned off or when the dial knob 110 is not rotated by the user's operation for a preset time, the controller 122 may rotate the dial knob 110 by controlling the motor 123 based on whether the light receiver 127 operates.

Figure 4B:
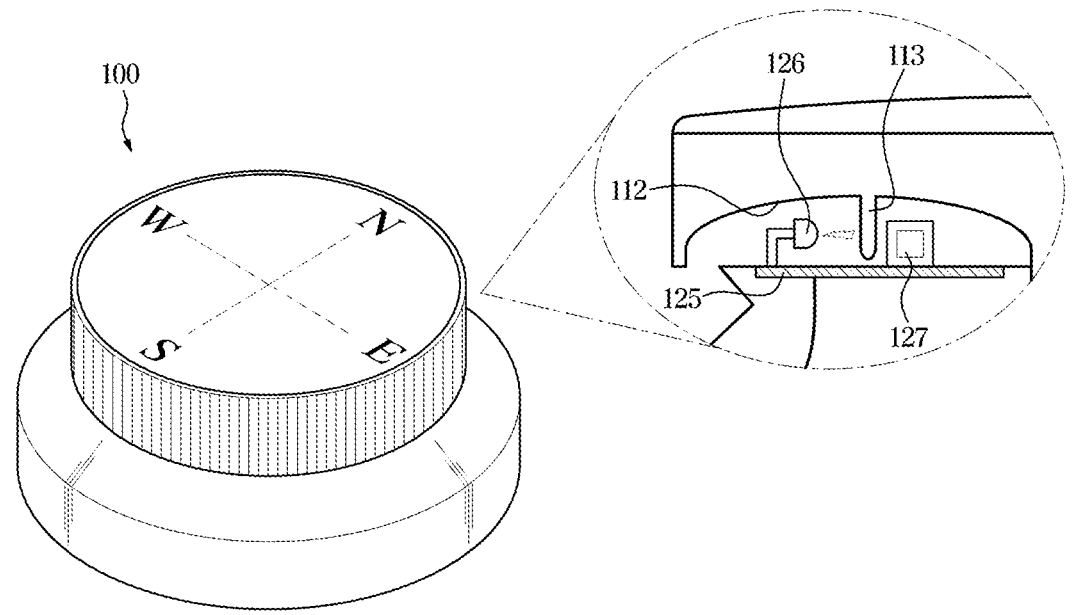
FIG. 4B is a diagram illustrating a lateral cross-sectional view of an input device when a dial knob is not positioned in a forward direction according to an exemplary embodiment of the present invention.

As described in FIG. 4A and FIG. 4B, when the dial knob 110 is positioned at a predetermined reference position, the protruding portion 113 formed on the bottom portion of the dial knob 110 is not protruded or a hole is formed are located between the light emitter 126 and the light receiver 127.

That is, when the dial knob 110 is positioned at a predetermined reference position, the light receiver 127 may receive light irradiated from the light emitter 126.

Using the present principle, the controller 122 rotates the dial knob 110 by operating the motor 123 when the light receiver 127 does not operate, and rotates the dial knob 110 to a predetermined reference position by stopping the operation of the motor 123 when the light receiver 127 operates.

According to the various exemplary embodiments of the present invention, when the engine is turned off or a rotation input is not received from the user for a preset time, the direction of the custom logo provided on the dial knob 110 is changed to the correct position, the image of the vehicle 10 may be enhanced.

Figure 7:
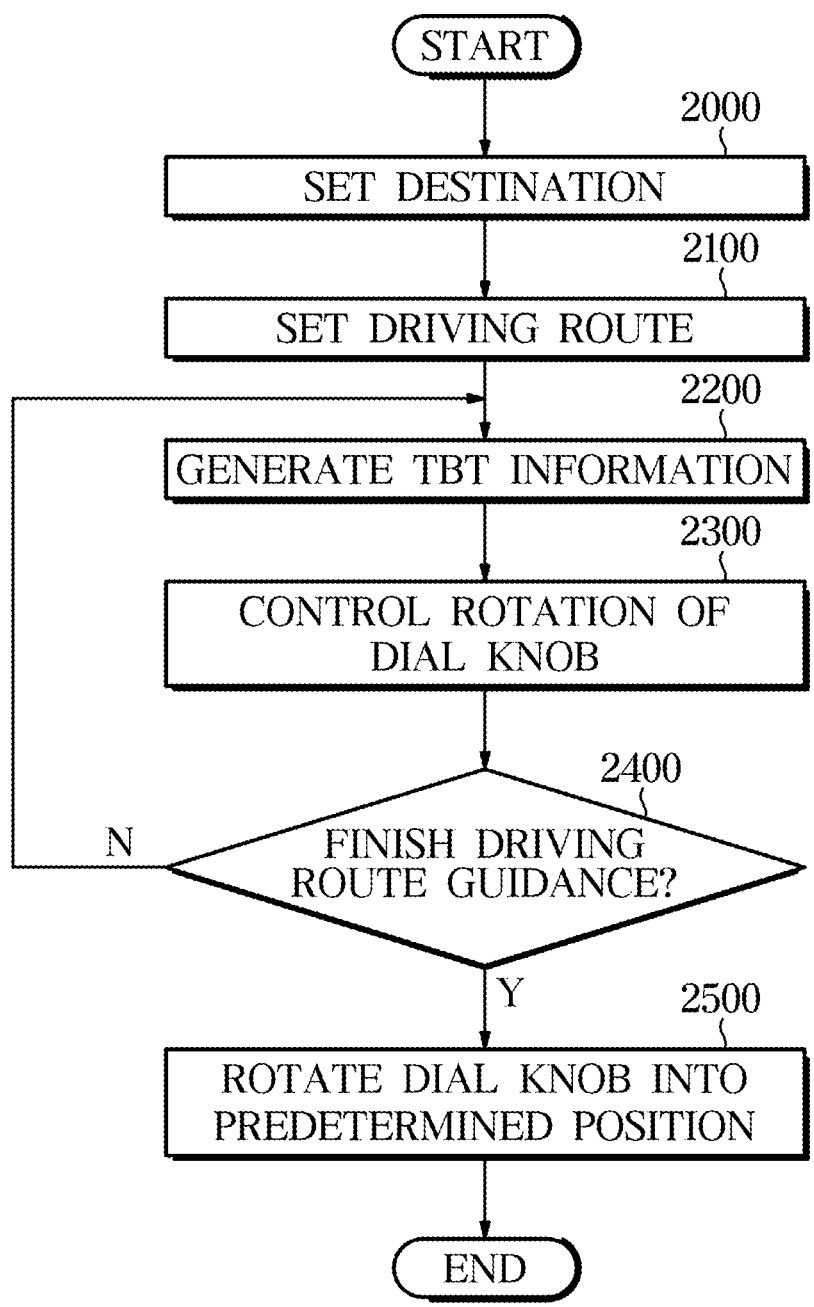
FIG. 7 is a flowchart of a vehicle control according to the various exemplary embodiments.
Figure 8:
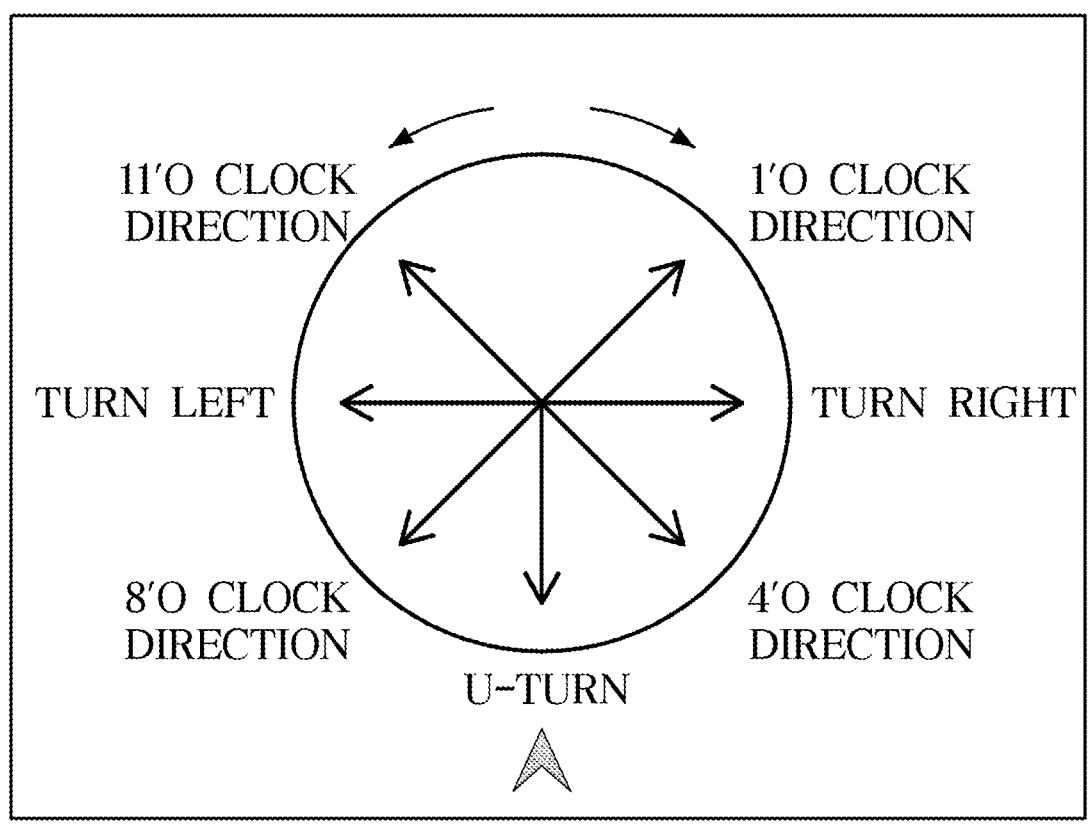
FIG. 8 is a diagram illustrating a rotation direction of a dial knob according to TBT information.

FIG. 7 is a flowchart of a vehicle control according to the various exemplary embodiments of the present invention, and FIG. 8 is a diagram illustrating a rotation direction of a dial knob according to TBT information.

Referring to FIG. 7, the AVN device 200 may receive a destination set by the user (2000).

The AVN device 200 may set a driving route based on a destination set by the user and a current location of the vehicle 10 (2100), and may generate TBT information based on the set driving route (2200).

The controller 122 included in the input device 100 may receive TBT information generated by the AVN device 200 and may rotate the dial knob 110 based on the TBT information (2300).

The controller 122 determines the rotation direction of the dial knob 110 based on the rotation direction of the vehicle 10 included in the TBT information, and controls the motor 123 to move the dial knob 110 to the determined rotation direction thereof.

Figure 9:
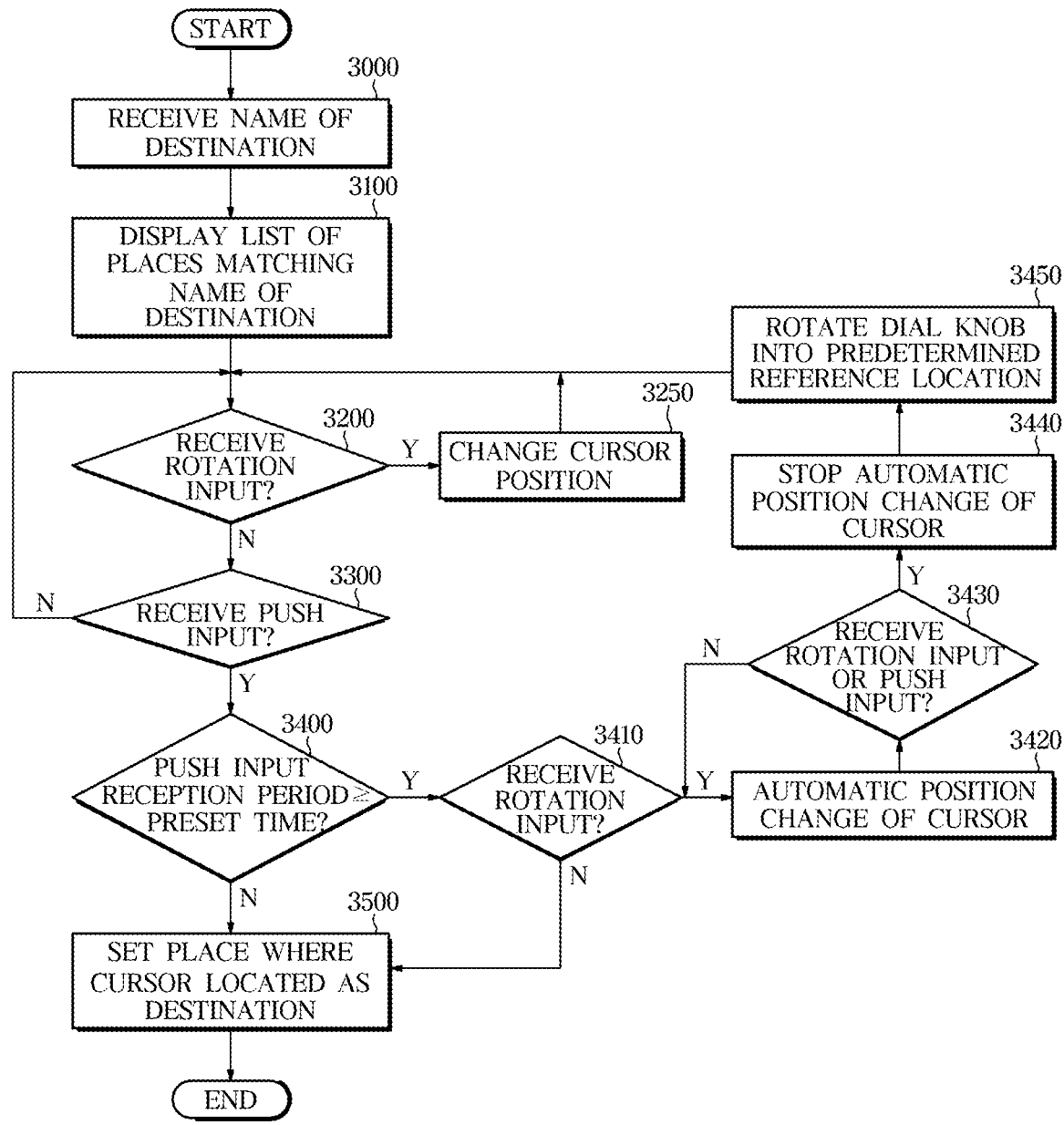
FIG. 9 is a flowchart of a vehicle control according to the various exemplary embodiments.

For example, referring to FIG. 9, the controller 122 may rotate the dial knob 110 clockwise 30 degrees when the rotation direction of the vehicle 10 included in the TBT information is 1 o'clock, may rotate the dial knob 110 90 degrees clockwise when the rotation direction of the vehicle 10 included in the TBT information is a right rotation direction thereof, may rotate the dial knob 110 120 degrees clockwise when the rotation direction of the vehicle 10 included in the TBT information is 4 o'clock, may rotate the dial knob 110 clockwise or counterclockwise by 360 degrees when the rotation direction of the vehicle 10 included in the TBT information is a U-turn direction thereof, may rotate the dial knob 110 120 degrees counterclockwise when the rotation direction of the vehicle 10 included in the TBT information is 8 o'clock, may rotate the dial knob 110 90 degrees counterclockwise when the rotation direction of the vehicle 10 included in the TBT information is the left rotation direction thereof, and may rotate the dial knob 110 counterclockwise by 30 degrees when the rotation direction of the vehicle 10 included in the TBT information is 11 o'clock.

When the guidance of the driving route by the AVN device 200 ends (example of 2400), the controller 122 may rotate the dial knob 110 to a predetermined reference position based on whether the light receiver 127 operates (2500).

The driving route guidance by the AVN device 200 may be terminated when the vehicle 10 arrives at the destination or when the user inputs a command to cancel the driving route guidance.

According to the various exemplary embodiments of the present invention, when the driving route guidance of the AVN device 200 ends, the direction of the customized logo provided on the dial knob 110 is changed to the original position, enhancing the image of the vehicle 10. Furthermore, according to the various exemplary embodiments of the present invention, when the driver puts his hand on the input device 100, TBT information may be transmitted by tactile sense even if the looks forward while driving.

Figure 10:
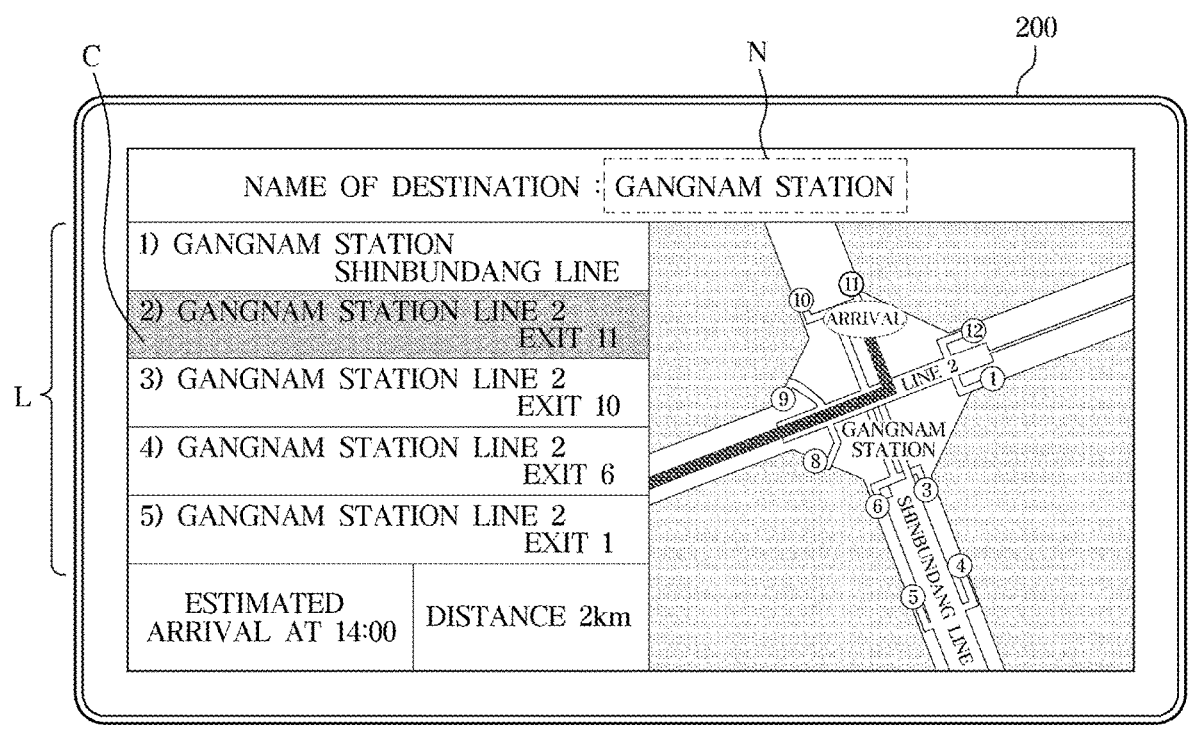
FIG. 10 is a diagram illustrating an image displayed on an AVN device according to an exemplary embodiment of the present invention.

FIG. 9 is a flowchart of a vehicle control according to the various exemplary embodiments of the present invention, and FIG. 10 is a diagram illustrating an image displayed on an AVN device according to an exemplary embodiment of the present invention.

Referring to FIGS. 9 to 10, the AVN device 200 may receive a destination name (N) from a user through voice input or touch input (3000).

When the name (N) of the destination is input, the AVN apparatus 200 may display a list (L) of places that match the name (N) of the destination (3100).

Thereafter, the user may set one of the places on the list L displayed through the input device 100 as a destination.

The user changes the position of the cursor C on the list by rotating the dial knob 110 of the input device 100 and pushes the push button 114 of the input device 100 to locate the cursor C and sets the position that cursor C is located as a destination.

To this end, the AVN device 200 changes the position of the cursor C on the list L based on the rotation input received from the dial knob 110, and sets the place where the cursor C is located as the destination of the vehicle 10 based on the push input received from the push button 114.

When the AVN device 200 receives a rotation input from the input device 100 (YES in 3200), the position of the cursor C may be changed (3250). At the instant time, when the received input is a clockwise rotation input, the AVN device 200 may change the position of the cursor C downward, and when a counterclockwise rotation input, the AVN device 200 may change the position of the cursor C upwards.

When the AVN device 200 receives a push input for a period shorter than a preset time (e.g., 2 seconds) from the input device 100 (No of 3300, 3400), a place where the cursor C is located may be set as a destination (3500).

Furthermore, when the AVN device 200 receives a push input from the input device 100 for a preset time, and the rotation input is not received while the push input is being received (No in 3410), a place where the cursor C is located may be set as a destination (3500).

On the other hand, when the AVN device 200 receives a push input for a preset time from the input device 100 and a rotation input is received while the push input is being received (Yes in 3410), the position of the cursor C may be continuously and automatically changed (3420).

For example, when the user presses the push button 114 for 2 seconds and rotates the dial knob 110 clockwise, the AVN device 200 may continuously change the position of the cursor C downward even if there is no additional rotation input.

Furthermore, when the user presses the push button 114 for 2 seconds and rotates the dial knob 110 counterclockwise, the AVN device 200 may continuously change the position of the cursor C upward even if there is no additional rotation input.

When the AVN device 200 receives a rotation input or a push input from the input device 100 while continuously automatically changing the position of the cursor C on the list (example of 3430), the AVN device 200 stops the automatic position change of the cursor C (3440).

That is, the cursor C on the list L may be fixed at the position at the time when the rotation input or the push input is received.

When the controller 122 of the input device 100 stops the automatic position change of the cursor C, the controller 122 rotates the dial knob 110 to a predetermined reference position based on whether the light receiver 127 operates (3450).

According to various exemplary embodiments of the present invention, the user can continuously and automatically change the position of the cursor C displayed on the AVN device 200 through a simple operation (push operation and rotation operation), convenience of manipulation for moving the cursor C may be improved.

Furthermore, when the automatic position change of the cursor C is stopped, the direction of the customized logo provided on the dial knob 110 is changed to the correct position, enhancing the image of the vehicle 10.

Meanwhile, some components of the vehicle 10 or the input device 100 may be software and/or hardware components such as a Field Programmable Gate Array (FPGA) and an Application Specific Integrated Circuit (ASIC).

The above-mentioned embodiments may be implemented in a form of a recording medium storing commands configured for being executed by a computer system. The commands may be stored in a form of program code. When the commands are executed by the processor, a program module is generated by the commands so that the operations of the disclosed exemplary embodiments may be conducted. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few embodiments of the present invention have been shown and described, it would be appreciated by those skilled in the art that changes may be made in these embodiments without departing from the principles and spirit of the present invention, the scope of which is defined in the claims and their equivalents.

According to various exemplary embodiments of the present invention, when the user ends the use of the vehicle, the position of the dial knob is restored to a preset position, enhancing the image formed on the vehicle.

Furthermore, the driver can recognize the driving direction of the vehicle by tactile sense while driving.

Furthermore, the driver can easily change the position of the cursor on the AVN device through simple manipulation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An input device provided in a vehicle, the input device comprising:
   a body;
   a light emitter provided on an upper side of the body;
   a light receiver provided at the upper side of the body to be spaced from the light emitter and configured to receive light irradiated from the light emitter to operate;
   a dial knob supported by the body and rotatable around a rotation axis of the dial knob in a response to a user's manipulation;
   a protruding portion protruding from a bottom portion of the dial knob between the light emitter and the light receiver to selectively transmit the light irradiated from the light emitter toward the light receiver according to a rotation input of the dial knob;
   an actuator connected to the dial knob and configured to rotate the dial knob; and
   a controller connected to the actuator and the light receiver and configured to control the actuator according to whether the light receiver is operated.

2. The input device according to claim 1, wherein the protruding portion is configured to transmit the light irradiated from the light emitter toward the light receiver when the dial knob is positioned at a predetermined reference position.

3. The input device according to claim 1, wherein the protruding portion is configured to block the light irradiated from the light emitter toward the light receiver when the dial knob is not positioned at a predetermined reference position.

4. The input device according to claim 1, wherein the controller is configured to operate the actuator to rotate the dial knob when the light receiver does not operate.

5. The input device according to claim 4, wherein the controller is configured to stop operating of the actuator when the light receiver operates.

6. The input device according to claim 1, wherein the controller is configured to control the actuator according to whether the light receiver is operated when the vehicle is turned off.

7. The input device according to claim 1, wherein the controller is configured to control the actuator according to whether the light receiver is operated when the dial knob is not rotated by the user's manipulation for a predetermined time period.

8. The input device according to claim 1, wherein the dial knob includes:
   a connector connected to the actuator; and
   a concave portion formed to be concave outside the connector.

9. The input device according to claim 8, wherein the protruding portion is formed in the concave portion of the dial knob.

10. The input device according to claim 1,
    wherein the light emitter and the light receiver are provided on a first printed circuit board provided on an upper side of the body,
    wherein the controller and the actuator are provided on a second circuit board provided inside the body, and
    wherein the first printed circuit and the second printed circuit board are electrically connected.

11. The input device according to claim 1, wherein the light emitter irradiates the light when audio video navigation (AVN) device of the vehicle is turned on.

12. A vehicle including audio video navigation (ANV) device and the input device according to claim 1.

13. The vehicle according to claim 12,
    wherein the AVN device is configured to set a driving route according to a destination set by the user and a current location of the vehicle, and to generate Turn by Turn (TBT) information according to the set driving route, and
    wherein the input device is configured to rotate the dial knob according to the TBT information generated by the AVN device.

14. The vehicle according to claim 13, wherein the input device is configured to determine a rotation direction of the dial knob according to a rotation direction of the vehicle included in the TBT information, and to rotate the dial knob in the determined rotation direction.

15. The vehicle according to claim 13, wherein the input device is configured to rotate the dial knob to a predetermined reference position according to whether the light receiver is operated when a driving route guidance by the AVN device is finished.

16. The vehicle according to claim 12,
wherein the input device further includes a push button provided on the upper side of the dial knob and configured to receive a push input thereto, and
wherein the AVN device is configured to receive a name of a destination from the user, to display a list of places matching the name of the received destination, to change a position of a cursor on the list according to the rotation input received from the dial knob, and to set a place where the cursor is located as the destination of the vehicle according to the push input received from the push button, and to continuously automatically change the position of the cursor on the list when the push input is received for a predetermined time period and the rotation input is received while the push input is being received.

17. The vehicle according to claim 16, wherein the AVN device is configured to stop the automatically changing of the position of the cursor when the push input or the rotation input is received while continuously automatically changing the position of the cursor on the list.

18. The vehicle according to claim 17, wherein the input device is configured to rotate the dial knob to a predetermined reference position according to whether the light receiver is operated when the automatically changing of the position of the cursor is stopped.

\* \* \* \* \*